(12) United States Patent
Bertrand

(10) Patent No.: US 7,203,603 B2
(45) Date of Patent: Apr. 10, 2007

(54) METHOD OF DETERMINING COMPONENTS OF FORCES EXERTED ON A TIRE AND DETERMINING THE SELF-ALIGNMENT TORQUE

(75) Inventor: David Bertrand, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/773,015

(22) Filed: Feb. 5, 2004

(65) Prior Publication Data

US 2004/0158414 A1    Aug. 12, 2004

Related U.S. Application Data

(63) Continuation of application No. pct/ep02/08619, filed on Aug. 2, 2002.

(30) Foreign Application Priority Data

Aug. 6, 2001 (FR) .................. 01 10564

(51) Int. Cl.
*G01L 1/00* (2006.01)
(52) U.S. Cl. .......................... 702/41; 73/146
(58) Field of Classification Search ................ 702/41; 73/146; 152/209.1, 209.18, 454
See application file for complete search history.

(56) References Cited

U.S. PATENT DOCUMENTS

| | | | |
|---|---|---|---|
| 3,852,993 A | 12/1974 | Bronovets et al. | |
| 4,715,662 A | 12/1987 | van Zanten et al. | |
| 4,724,704 A | 2/1988 | Alain | 73/146.2 |
| 4,817,421 A | 4/1989 | Himmier | |
| 4,836,257 A | 6/1989 | Mamada et al. | |
| 4,862,368 A | 8/1989 | Kost et al. | |
| 5,365,781 A | 11/1994 | Rhyne | |
| 5,892,139 A | 4/1999 | Miyazaki | |
| 5,913,240 A | 6/1999 | Drahne et al. | |
| 5,964,265 A | 10/1999 | Becherer | |
| 6,021,367 A | 2/2000 | Pilutti et al. | 701/41 |
| 6,083,268 A | 7/2000 | Kelsey et al. | |
| 6,256,894 B1 | 7/2001 | Naruse et al. | |
| 6,263,994 B1 | 7/2001 | Eitel | 180/219 |

(Continued)

FOREIGN PATENT DOCUMENTS

DE     39 39 917 A1    6/1991

(Continued)

OTHER PUBLICATIONS

Patent Abstracts of Japan 0 2270682, Nov. 1990.

*Primary Examiner*—Michael Nghiem
*Assistant Examiner*—Xiuqin Sun
(74) *Attorney, Agent, or Firm*—Fitzpatrick, Cella, Harper & Scinto

(57) ABSTRACT

A method of determining at least one characteristic of a tire selected from the three components of a resultant of forces which are exerted by the road on the contact area of a tire and the self-alignment torque generated by the tire, includes the steps of making at least two measurements of circumferential extension or contraction in at least one sidewall of the tire at two fixed points in space, which are situated at different azimuths along the circumference, and based on the measurements deriving a value for the selected characteristic.

16 Claims, 12 Drawing Sheets

U.S. PATENT DOCUMENTS

| | | |
|---|---|---|
| 6,266,600 B1 | 7/2001 | Miyazaki |
| 6,338,270 B1 | 1/2002 | Mancosu et al. |
| 6,339,956 B1 | 1/2002 | Huinink et al. |
| 6,430,993 B1 | 8/2002 | Seta |
| 6,556,911 B2 | 4/2003 | Matsuno |
| 6,561,018 B2 | 5/2003 | Mancosu et al. |
| 6,564,625 B1 | 5/2003 | Ishiyama |
| 6,597,980 B2 | 7/2003 | Kogure |
| 6,666,079 B2* | 12/2003 | Poulbot et al. ............... 73/146 |
| 6,761,060 B2 | 7/2004 | Mancosu et al. |
| 6,763,288 B2* | 7/2004 | Caretta et al. ................. 701/1 |
| 6,772,058 B2 | 8/2004 | Miyazaki |
| 6,962,075 B2 | 11/2005 | Bertrand |
| 7,069,135 B2 | 6/2006 | Bertrand |
| 7,099,765 B2 | 8/2006 | Bertrand |
| 2002/0157746 A1 | 10/2002 | Merino-Lopez et al. |
| 2004/0036590 A1* | 2/2004 | Elsner et al. ................ 340/445 |
| 2005/0005692 A1* | 1/2005 | Giustino ...................... 73/146 |
| 2005/0065698 A1 | 3/2005 | Bertrand |
| 2005/0065699 A1 | 3/2005 | Bertrand |
| 2005/0159874 A1 | 7/2005 | Bertrand |

FOREIGN PATENT DOCUMENTS

| | | |
|---|---|---|
| DE | 44 35 448 A1 | 4/1995 |
| EP | 0 937 615 A2 | 8/1999 |
| EP | 0 949 496 | 10/1999 |
| EP | 1 026 490 A2 | 8/2000 |
| EP | 1 030 170 | 8/2000 |
| EP | 1 095 794 A2 | 5/2001 |
| JP | 2270682 A | 5/1990 |
| WO | 01 36241 A1 | 5/2001 |
| WO | WO 01/92078 | 12/2001 |

* cited by examiner

METHOD OF DETERMINING COMPONENTS OF FORCES EXERTED ON A TIRE AND DETERMINING THE SELF-ALIGNMENT TORQUE

CROSS REFERENCE TO RELATED APPLICATION

This application is a continuation of International Application PCT/EP02/08619, filed Aug. 2, 2002, which claims priority to French Patent Application 01/10564, filed Aug. 6, 2001.

BACKGROUND OF THE INVENTION

The present invention relates to vehicles, and to measurement of the forces which are exerted by the road on the tires of vehicles.

The present invention also relates to the various electronic assistance devices used, for example, for antilock control of the brakes of a vehicle or antiskid control of the drive wheels, control of the trajectory of a vehicle or other forms of control or monitoring, for instance the pressure of the tires.

In order to control the handling of a vehicle, attempts have been made to determine certain rolling parameters. For instance, in order to reduce the longitudinal slip of the wheels, slip limitation systems (A.B.S., A.S.R.) have been developed which are capable of modulating the torque transmitted to the wheel by the engine or the brake, as a function of the slip derived from the variations in speed of rotation of each wheel. It has also been proposed to measure the torsion (circumferential angular deformation) of the sidewalls of a tire, in order to determine the variations in the torque transmitted to the road. This measurement, which is more direct than derivation from the variation in the speed of rotation, can allow more refined control of the slip limitation systems.

Systems (such as E.S.P.) are also known which influence the brakes or the drive power applied to the wheels to ensure that the trajectory desired by the driver is actually followed by the vehicle. In order to do this, the yaw velocity (velocity of rotation of the vehicle about a vertical axis), the rolling speed, the transverse acceleration of the vehicle and the angular position which the driver applies to the steering wheel, are generally measured simultaneously.

SUMMARY OF THE INVENTION

The invention starts from the observation that all the forces exerted by the road on the vehicle are transmitted via the wheels. It is the balance of these forces which dictates the accelerations experienced by the vehicle. Therefore, determining all these forces could make it possible to dispense with the various sensors mentioned above, or to complement them in order to provide more complete information.

The method of the invention is based on recognition of the fact that the forces acting between the tread of the tire and the road cause a substantial and reproducible deformation in the form of a circumferential extension or contraction of the sidewalls of the tires. This circumferential extension or contraction deformation, if one manages to measure it individually during rotation of the tire in real time, can make it possible to know at each instant the direction and magnitude of the forces acting on the tire, as well as the sign and the magnitude of the self-alignment torque exerted by the tire.

Owing to its design and mode of operation, the deformations generated in the tire when it is placed under stress depend on its inflation pressure. The inflation pressure is therefore one of the parameters of the method proposed here. This pressure may be known through a specific measurement means which is independent of the measurements taken in the context of this invention, an example of such a means being a pressure sensor. This pressure may also proceed from specific processing of the measurement of the circumferential deformations.

Under actual conditions of use, the tire is frequently subjected to variations in the camber angle. This leads to a modification of the deformations of the tire. The camber is therefore one of the parameters of the method proposed here. The camber may be known through a specific measurement means which is independent of the measurements taken in the context of this invention, an example of such a means being a camber angle sensor. This camber may also proceed from specific processing of the measurement of the circumferential deformations.

The invention proposes a method of determining at least one of the characteristics selected from: the three components (x component, y component, and z component) of a resultant of forces which are exerted by the road on the contact area of a tire, the self-alignment torque generated by the tire, the camber, and the pressure, the method characterised in that the characteristic is determined by processing at least two measurements of circumferential extension or contraction in at least one sidewall of the tire at at least two fixed points in space, which are situated at different azimuths along the circumference.

According to one advantageous aspect, the invention proposes to estimate the circumferential contraction or extension of the sidewalls by measuring the distance between the cords of the carcass ply in the sidewalls. This will be referred to below as measurement of the "inter-cord separation." It should be noted that, although this term is linked with the radial structure of a tire, the method applies not just to tires with a radial carcass. For instance, the term "cord separation" will be used to denote the average distance between two lines made on the sidewall at adjoining but different azimuths.

It should be noted that, in the event that the circumferential extension of the sidewalls is being measured in the thickness of the sidewalls at a position different from their flexurally neutral fiber, the circumferential extension includes a component due to the flexure of the sidewall, in particular when passing through the contact area (a phenomenon also referred to as "bellying"). This component due to flexure is by no means a problem, and it can be exploited to increase the dynamics of variation of the signals used by the invention, by performing the measurement of the extension elsewhere than on the flexurally neutral fiber.

BRIEF DESCRIPTION OF THE DRAWINGS

The rest of the description explains the invention in more detail with the aid of the appended figures, in which.

DETAILED DESCRIPTION OF THE INVENTION

The method described here relies on the fact that each force applied to the tire in the contact area causes a modification of the circumferential extension of the sidewalls of the tire. The case of an inflated tire mounted on its wheel will be considered, on whose first sidewall two points $A_1$ and $A_2$ are identified, which are placed on the same radius but are separated in the circumferential direction. On the second sidewall, at the same azimuths as $A_1$ and $A_2$ and on the same radius, two points $B_1$ and $B_2$ are selected. In the absence of any forces being applied to the tire, the distance separating the two points is constant as a function of the angle of rotation of the tire-wheel assembly.

Figure 1:
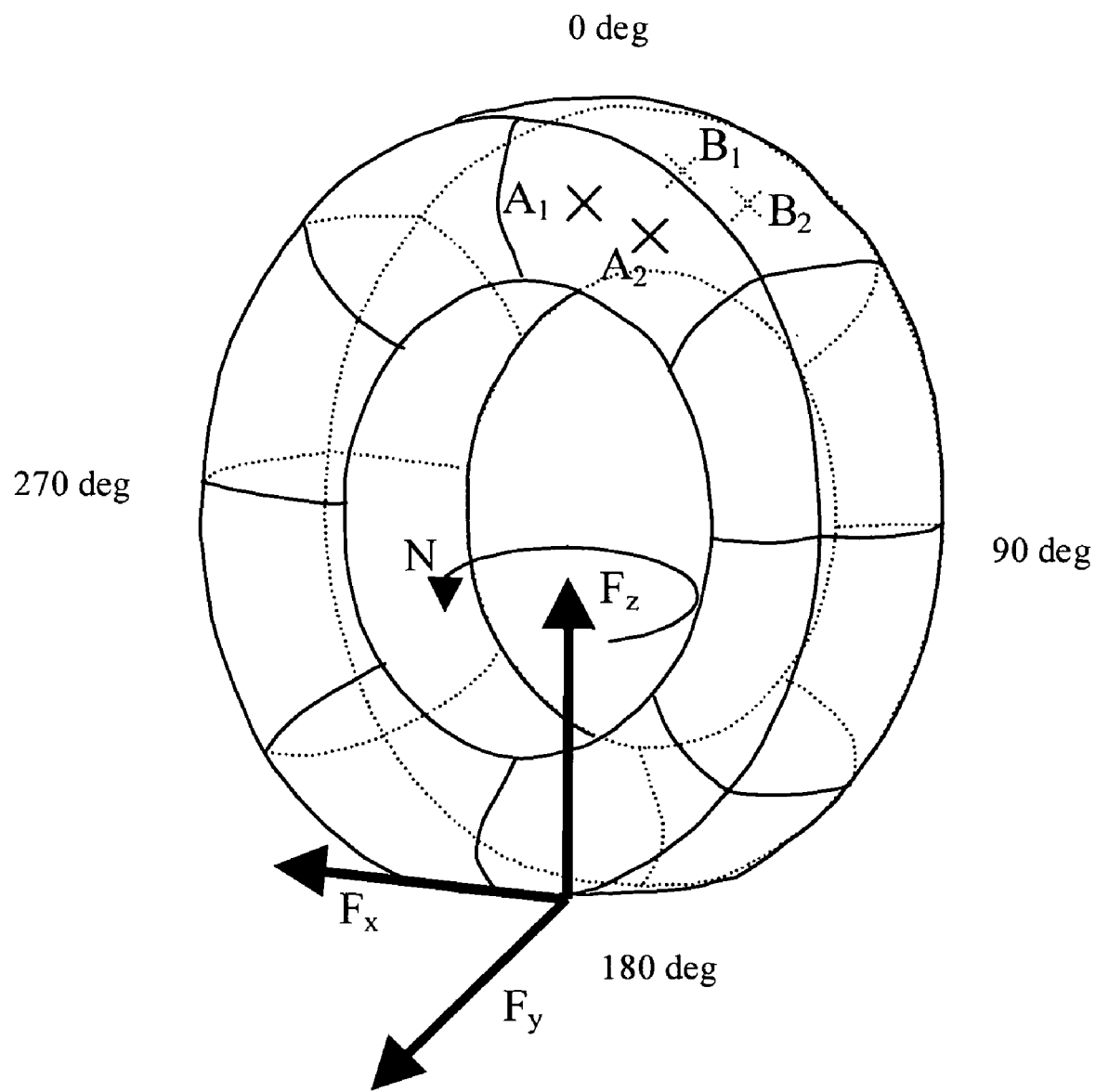
FIG. 1 is a perspective of a tire on which the conventions useful for understanding the invention are defined.
Figure 2A:
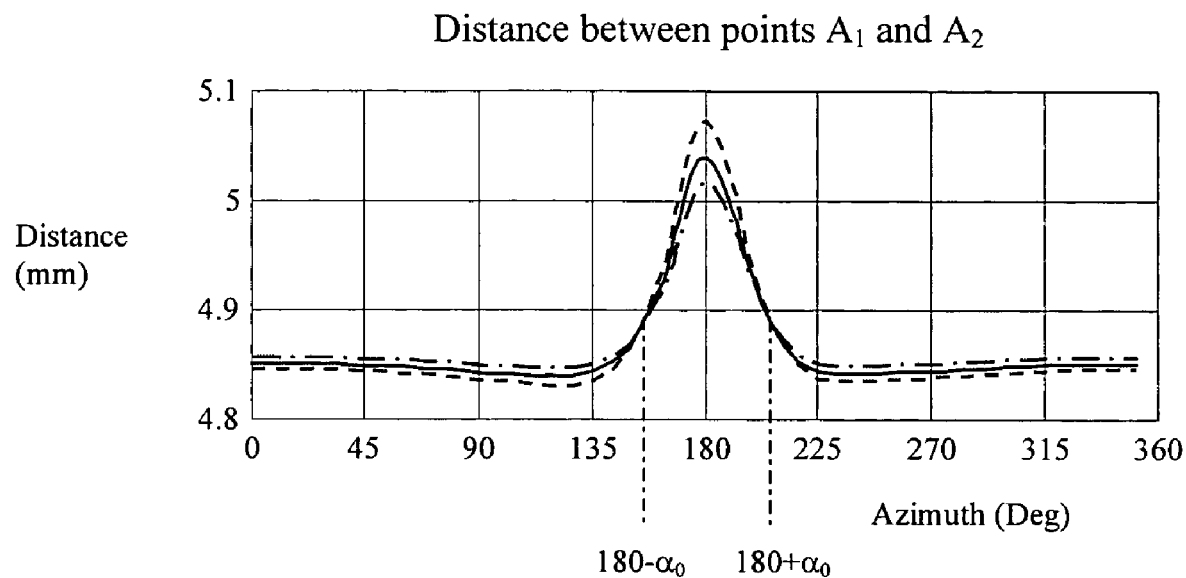
FIGS. 2a and 2b show the effect of the vertical component Fz, FIG. 2a for the points $A_1$ and $A_2$ and FIG. 2b for the points $B_1$ and $B_2$ in FIG. 1, where the solid curve corresponds to a vertical load of 400 daN, where the dotted curve corresponds to a vertical load of 500 daN, and where the dotted and dashed curve corresponds to a vertical load of 300 daN.
Figure 2B:
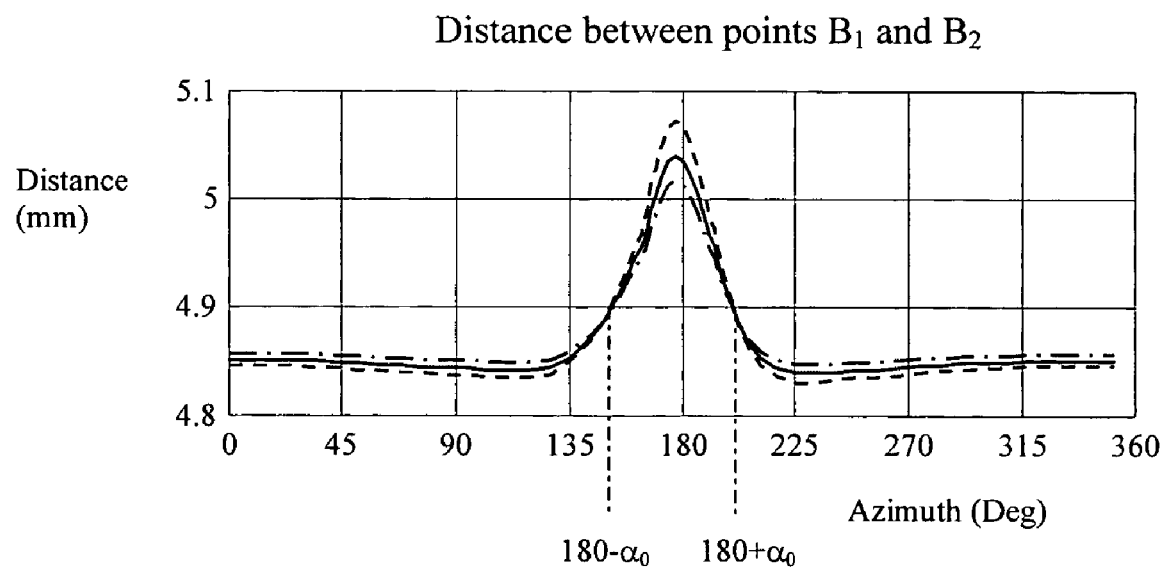

When the tire is subjected to forces, the following effects are observed for each of the components of the said forces:

The vertical component (denoted by Fz here) presses the tire onto the ground. By creating a contact area, the vertical force component leads to a variation of distance between the two points $A_1$ and $A_2$ when the fitted assembly is in rotation, reflecting a modification of the circumferential extension of the sidewalls. FIGS. 2a and 2b indicate the distance separating points A and points B, respectively, as a function of the azimuth where they lie. The increase of the applied vertical component leads to an extension of both sidewalls in the contact area (increase in the distance near 180°) and a contraction of the other zones of the sidewall, principally at the entry and exit of the contact area (decrease in the distance everywhere else, principally near 135° and 225°). It is also worth pointing out that there is one azimuth at the entry of the contact area, and one azimuth at the exit of the contact area, where the value of circumferential extension is substantially independent of the applied component Fz. Let $\alpha_0$ be such that these particular azimuths are equal to $(180-\alpha_0)°$ and $(180+\alpha_0)°$.

Figure 3A:
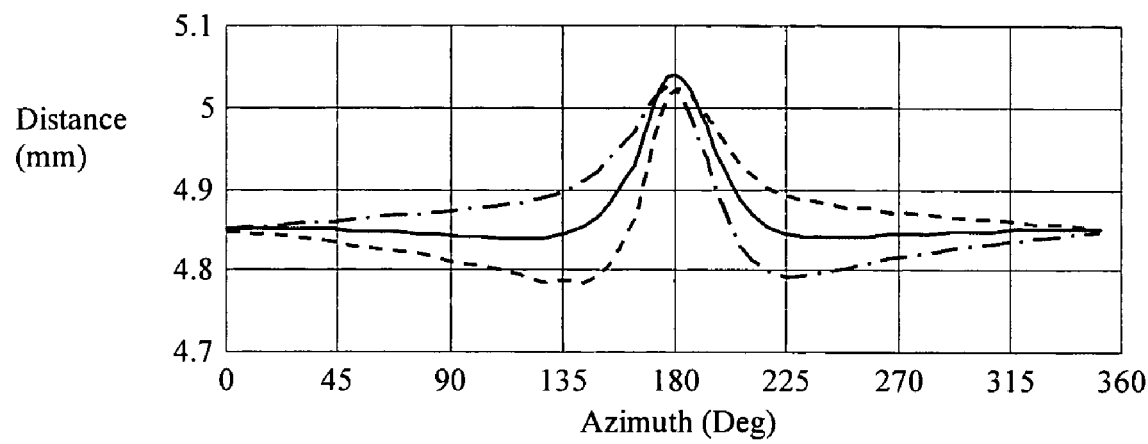
FIGS. 3a and 3b show the effect of the component Fx, FIG. 3a for the points $A_1$ and $A_2$ and FIG. 3b for the points $B_1$ and $B_2$ in FIG. 1, where the solid curve corresponds to a vertical load of 400 daN and an absence of any force Fx, where the dotted curve corresponds to a vertical load of 400 daN and a force Fx of 400 daN (driving), and where the dotted and dashed curve corresponds to a vertical load of 400 daN and a force Fx of −400 daN (braking)
Figure 3B:
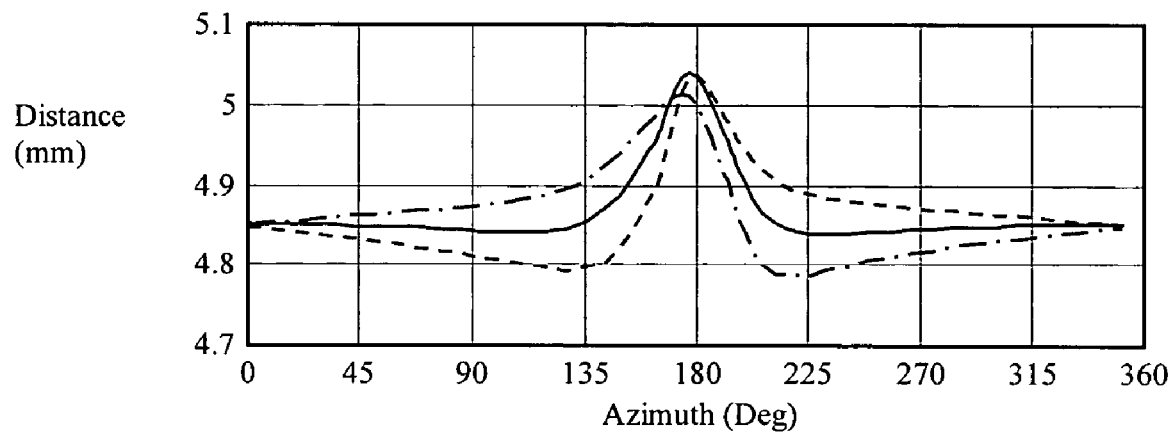

The horizontal component in the rolling direction (denoted by Fx here) causes differentiation between the zones situated at the entry and exit of the contact area. This entails changing of the extension of the sidewalls essentially at the entry and exit of the contact area. FIGS. 3a and 3b illustrate the effects of the component Fx of the applied forces by indicating the distance separating points A and points B, respectively, as a function of the azimuth where they lie. When a positive force Fx is applied (driving torque), both sidewalls are compressed in the circumferential direction at the entry of the contact area and in extension at the exit of the contact area (decrease in the distance near 135° and increase near 225°). When a negative force Fx is applied (braking torque), both sidewalls are compressed in the circumferential direction at the exit of the contact area and in extension at the entry of the contact area (decrease in the distance near 225° and increase near 135°).

Figure 4A:
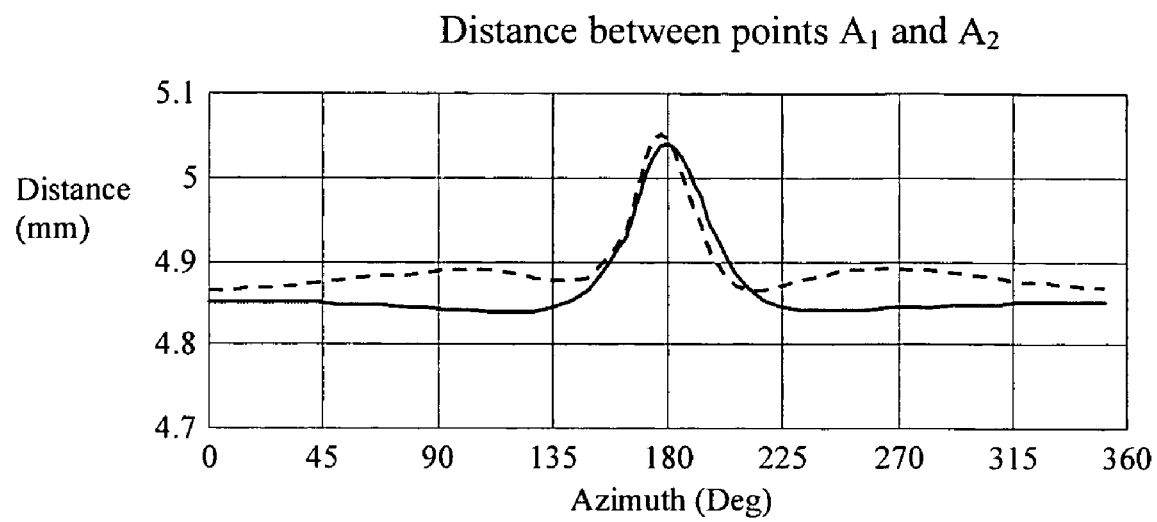
FIGS. 4a and 4b show the effect of the component Fy, FIG. 4a for the points $A_1$ and $A_2$ and FIG. 4b for the points $B_1$ and $B_2$ in FIG. 1, where the solid curve corresponds to a vertical load of 400 daN without any force Fy, and where the dotted curve corresponds to a vertical load of 400 daN with a force Fy of 280 daN.
Figure 4B:
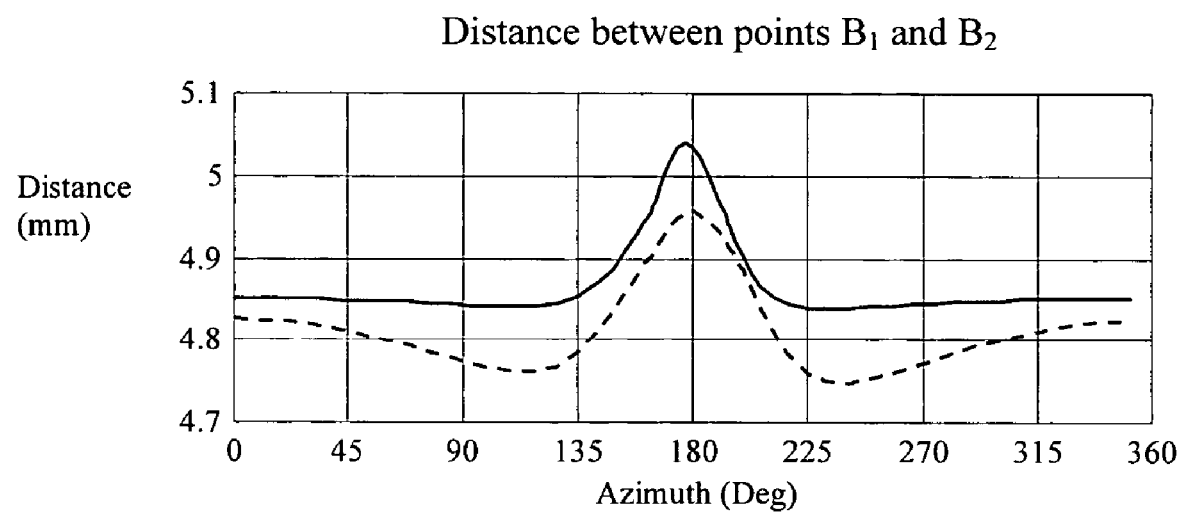

The horizontal component in the transverse direction (denoted by Fy here) principally causes differentiation between the two sidewalls. FIGS. 4a and 4b illustrate the effects of this type of applied stress by indicating the distance separating points A and points B, respectively, as a function of the azimuth where they lie. In the case of an applied stress with positive Fy, one of the sidewalls is principally put into circumferential extension (increase in the distance between $A_1$ and $A_2$), and the other sidewall is put into circumferential contraction (decrease in the distance between $B_1$ and $B_2$).

The self-alignment torque N (moment about the vertical axis) is not, strictly speaking, another force acting between the tread of the tire and the road. Rather, it is a consequence of the way in which the components Fx, Fy and Fz are applied in the contact area. If the point of application of the resultant, whose components are Fx, Fy and Fz, is not the center of the contact area, this resultant generates a moment about Oz, which is referred to as the self-alignment torque. The existence of this moment principally entails a rotation of the contact area about Oz. The consequence of this effect is, for example, a circumferential extension at the entry of the contact area and a circumferential contraction at the exit of the contact area, on one sidewall, whereas, on the other sidewall, a circumferential contraction at the entry of the contact area and a circumferential extension at the exit of the contact area is observed, with respect to a situation with zero self-alignment torque.

Figure 5:
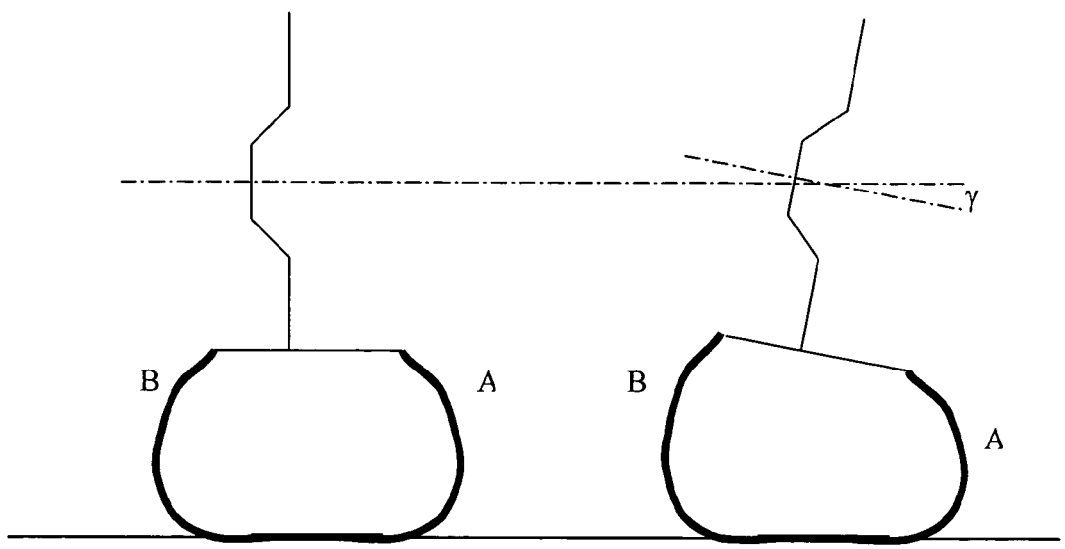
FIG. 5 shows the deformation of the tire when a camber angle is applied.
Figure 6A:
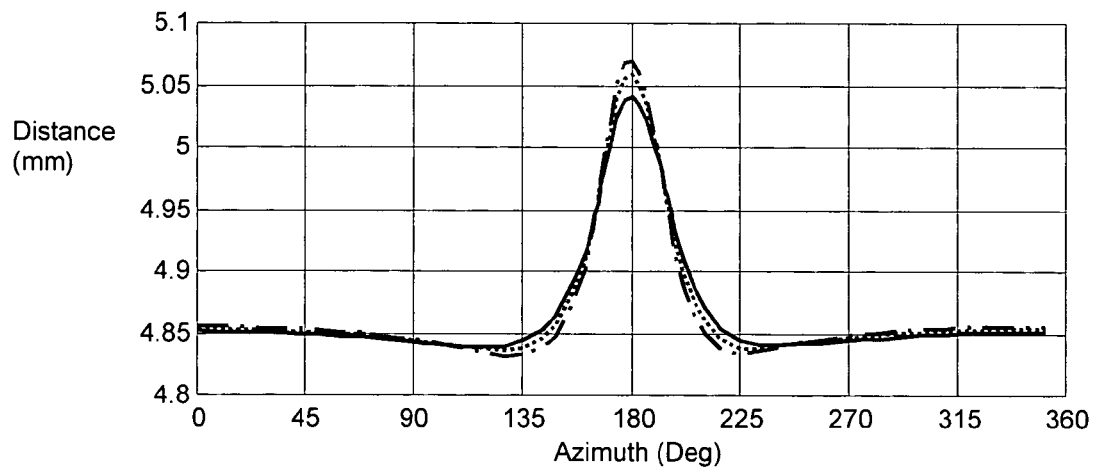
FIGS. 6a and 6b show the effect of the camber on the circumferential deformation signals, FIG. 6a for the points $A_1$ and $A_2$ and FIG. 6b for the points $B_1$, and $B_2$ in FIG. 1, where the solid curve corresponds to a vertical load of 400 daN without any forces Fx and Fy, and to a zero camber angle, where the dotted curve corresponds to a vertical load of 400 daN with a camber angle of 2°, and where the dotted and dashed curve corresponds to a vertical load of 400 daN with a camber angle of 4°.
Figure 6B:
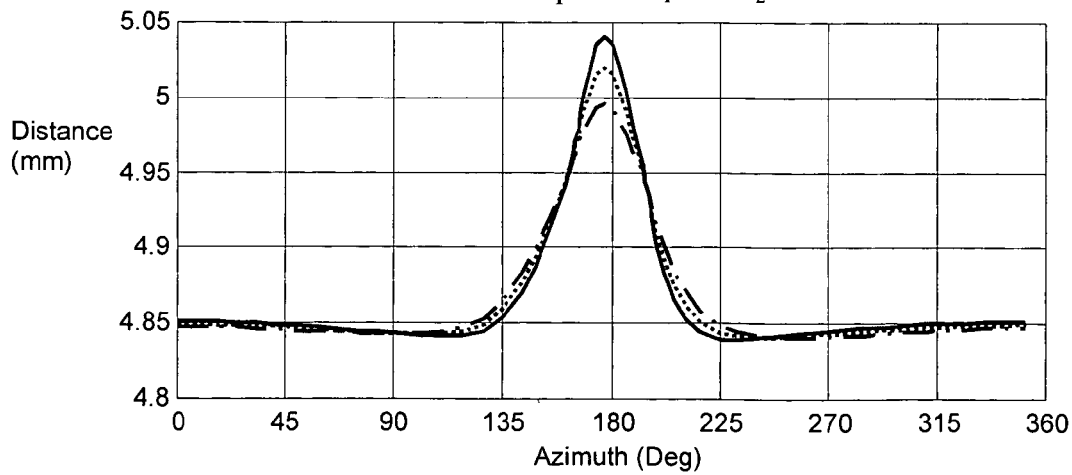

In the event that a camber angle is applied to the tire, the behavior of the two sidewalls is different. Simplistically, everything happens as if one sidewall were carrying more load than the other. FIG. 5 illustrates this behaviour by comparing a cross section of the part of the tire in the contact area without any camber and with a camber γ. This also results in a slight lateral displacement of the contact area, which entails a thrust in the Y direction. FIGS. 6a and 6b show the change of the circumferential deformation in both sidewalls. On the overloaded sidewall (points A), the change is similar to that of an increase in the load. On the other sidewall (points B), a change is seen which is compatible with a decrease in the load being supported. Given that the changing is odd in relation to the sidewalls and even in relation to the azimuth, it is readily possible to distinguish an effect of the camber from an effect of Fx, Fz or N. FIGS. 4 and 6 show that the consequences of Fy and of the camber are not identical; it is therefore possible to establish an unambiguous relationship between the circumferential deformation signals and the camber. It is then possible to estimate the camber angle at which the tire is working, with the aid of the measurements of circumferential deformation.

The apparent rigidity of a tire originates both from its pneumatic behavior (from its inflation pressure) and from its structural rigidity (rigidity of its architecture). The measured circumferential deformation signals themselves also contain a pneumatic component and a structural component. For example, the deformation signals of a tire inflated to 2 bar and loaded with 400 daN along Z are not identical to those delivered by the same tire at 2.5 bar and loaded with 500 daN. This difference corresponds to the pneumatic contribution, and can make it possible to estimate the inflation pressure of the tire.

In the event that the inflation pressure varies, the relationships which link the applied forces and the deformation signals are quantitatively modified, but without their nature being changed. The extension factors in the sidewalls are influenced by the pressure and by the load; they are made up of a contribution due to the "pneumatic" behavior (that is to say dependent on the inflation pressure) and another contribution due to the structural behaviour (that is to say of the constituent materials of the tire and their arrangement), which does not change when the pressure changes, so that information about the pressure can be obtained.

The method may thus be explained firstly in the case of an inflation pressure which is assumed to be constant, for the sake of simplicity. Likewise, it will be considered below that the camber is constant and zero, to make the explanation clearer, and only the most interesting cases concerning this parameter will be mentioned.

When a stress which mixes components Fx, Fy, and Fz is applied, a superposition of the aforementioned effects on the extension in the circumferential direction is observed. One of the advantages of the proposed method is that it makes it possible to separate the contributions of each component of the applied stress, so as to make it possible to estimate each of these components.

The approach which is used relies partly on significant parity characteristics, which correspond to the natural symmetries of the tire, in order to carry out this separation.

The azimuth $\theta$ will be defined as the angle at which the circumferential extension of the sidewalls is being analysed. The origin of the azimuth is taken on the opposite side from the center of the contact area. The center of the contact area therefore has the azimuth 180°.

The extension signal as a function of the azimuth, $s(\theta)$, can then be divided into two signals $s_p(\theta)$ and $s_i(\theta)$, which are such that:

$$s(\theta) = s_p(\theta) + s_i(\theta)$$

$$s_i(180+\theta) = -s_i(180-\theta)$$

$$s_p(180+\theta) = s_p(180-\theta)$$

$s_i$ is referred to as the odd part of s, and $s_p$ is referred to as the even part of s.

Likewise, let $s^1(\theta)$ and $s^2(\theta)$ be the signals associated with measurement of circumferential extension on each of the sidewalls of the tire. The following are defined:

$$s^P(\theta) = \frac{s^1(\theta) + s^2(\theta)}{2}$$

$$s^i(\theta) = \frac{s^1(\theta) - s^2(\theta)}{2}$$

$s^P$ is referred to as the sidewall-related even part and $s^i$ is referred to as the sidewall-related odd part.

It should be noted that this division by parity according to the sidewalls may equally well be applied to $s_i$ and $s_p$. Four signals $s_i^i$ $s_i^P$ $s_p^i$ $s_p^P$ are then obtained on the basis of a measurement carried out on each sidewall.

The forces Fx, Fy, Fz and the self-alignment torque N are, owing to their orientations, linked with certain symmetries. In particular, this principle can be used to decouple the effects of the force components on the tire.

Hence, according to the observations (FIGS. 2a, 2b, 3a, 3b, 4a and 4b), the signal:

$s_i^P$ is mainly linked with the force Fx;

$s_p^i$ is mainly linked with the force Fy;

$s_p^P$ is mainly linked with the force Fz.

The symmetries which apply furthermore make it possible to confirm that the signal $s_i^i$ is principally linked with the self-alignment torque N.

By virtue of these observations, the method explained here proposes to carry out measurements of the circumferential extension on at least one sidewall of the tire. Thanks to mathematical operations (linear or non-linear combinations of the measurements carried out at the various azimuths), these measurements make it possible to estimate the values of the signals $s_i^P$ $s_p^i$ $s_p^P$ and $s_i^i$ at certain azimuths, and thereby to provide an evaluation of the components of the applied force.

With a view to clarifying the procedure, some examples in which the method is used but which are not exhaustive and in no way limit the usable configurations to those listed here, are presented here.

The case in which the measurements are carried out on only one sidewall will be considered.

EXAMPLE 1

The intention is to estimate the components of the forces which are applied in the contact area and the self-alignment torque, on the basis of measurements of the circumferential extension of one sidewall of the tire, measured at three azimuths. The measurement azimuths are selected in the following way:

One of the azimuths corresponds to the middle of the contact area (azimuth 180°). Let $V_c$ be the value measured at this point. The azimuth which corresponds to the opposite side from the contact area can be used equivalently.

The other two azimuths are symmetrical with respect to the azimuth of the center of the contact area. (180°+α° and 180°−α°). Let $V_1$ and $V_2$ be the values measured at these points.

According to the observations above:

$V_2 - V_1$ makes it possible to estimate the imbalance between the entry of the contact area and the exit. This value will be principally linked with the component Fx. An estimate of Fx is given by $f_x(r_2 V_2 - r_1 V_1)$, where $r_1$ and $r_2$ are positive real coefficients and $f_x$ is a monotonic continuous function.

$V_c - (V_1 + V_2)$ makes it possible to estimate the difference between passage through the contact area and outside the contact area. The result here is principally linked with Fz. An estimate of Fz is given by $f_z(s_c V_c-(s_1 V_1+s_2 V_2))$, where $s_1$, $s_2$ and $s_c$ are positive real coefficients and $f_z$ is a monotonic continuous function.

$V_c+V_1+V_2$ gives an indication of the overall extension of the sidewall. This value will be principally linked with the component Fy of the applied force. An estimate of Fy is given by $f_y(u_c V_c+u_1 V_1+u_2 V_2)$, where $u_1$, $u_2$ and $u_c$ are positive real coefficient and $f_y$ is a monotonic continuous function.

In this example, four components (Fx, Fy, Fz and N) are estimated on the basis of three measurements of circumferential extension. Indeed, there are cases in which the self-alignment torque is dependent directly and only on the components Fx, Fy and Fz. It can then be estimated as well. In the event that the self-alignment torque depends on other parameters, it is necessary to measure the circumferential extension in the sidewalls at a greater number of azimuths.

EXAMPLE 2

The intention is to estimate the components of the forces which are applied in the contact area, and the self-alignment torque, on the basis of measurements of the circumferential extension of one sidewall of the tire, measured at five azimuths. The measurement azimuths are selected in the following way:

One of the azimuths corresponds to the middle of the contact area (azimuth 180°). Let $V_c$ be the value measured at this point.

Two other azimuths are symmetrical with respect to the azimuth of the center of the contact area. (180°+α° and 180°−α°). Let $V_1$ and $V_2$ be the values measured at these points.

The final two azimuths are symmetrical with respect to the azimuth of the center of the contact area. (180°+β° and 180°−β°). Let $V_3$ and $V_4$ be the values measured at these points.

Combinations which are of the same nature as, but a little more complex than, those explained in Example 1 make it possible to determine the components Fx, Fy, Fz and N in this case, including cases in which the self-alignment torque is dependent not only on the components Fx, Fy and Fz.

Experimental verifications have made it possible to confirm that this measurement configuration affords the possibility of distinguishing the effects of Fy from the effects of the camber; consequently, the method is also valid under conditions of non-zero camber, and it is possible to evaluate the camber angle simultaneously with the components Fx, Fy, Fz and N.

The case in which the measurements are carried out on both sidewalls will now be considered.

EXAMPLE 3

The intention is to estimate the components of the forces which are applied in the contact area and the self-alignment torque, on the basis of measurements of the circumferential extension of both sidewalls of the tire, measured at two azimuths on each sidewall. The measurement azimuths are selected symmetrically with respect to the azimuth of the center of the contact area (180°α° and 180°−α°). So that Fz can be estimated, α must not be equal to $α_0$. Let $V_1^1$ and $V_2^1$ be the values measured at these azimuths on the first sidewall, and $V_1^2$ and $V_2^2$ the values measured at these azimuths on the second sidewall.

Thanks to these four values, it is possible to determine the components by using decomposition according to the azimuth-related and sidewall-related parities:

$V_1^1+V_1^2+V_2^1+V_2^2$ gives the azimuth-related and sidewall-related even component. This combination is therefore directly linked with Fz. An estimate of Fz is given by $f_z(a_1 V_1^1+a_2 V_2^1+b_1 V_1^2+b_2 V_2^2)$, where $a_1$, $a_2$, $b_1$ and $b_2$ are positive real coefficients and $f_z$ is a monotonic continuous function.

$V_1^1+V_1^2-(V_2^1+V_2^2)$ gives the azimuth-related odd and sidewall-related even component. This combination is therefore directly linked with Fx. An estimate of Fx is given by $f_x(c_1 V_1^1-c_2 V_2^1+d_1 V_1^2-d_2 V_2^2)$, where $c_1$, $c_2,d_1$ and $d_2$ are positive real coefficients and $f_x$ is a monotonic continuous function.

$V_1^1-V_1^2+(V_2^1-V_2^2)$ gives the azimuth-related even and sidewall-related odd component. This combination is therefore directly linked with Fy. An estimate of Fy is given by $f_y(e_1 V_1^1+e_2 V_2^1-f_1 V_1^2-f_2 V_2^2)$, where $e_1$, $e_2,f_1$ and $f_2$ are positive real coefficients and $f_y$ is a monotonic continuous function.

$V_1^1-V_1^2-(V_2^1-V_2^2)$ gives the azimuth-related odd and sidewall-related odd component. This combination is therefore directly linked with N. An estimate of N is given by $f_n(g_1 V_1^1-g_2 V_2^1-h_1 V_1^2+h_2 V_2^2)$, where $g_1$, $g_2$, $h_1$ and $h_2$ are positive real coefficients and $f_n$ is a monotonic continuous function.

This type of arrangement makes maximum use of the symmetries of the tire, and very good precision may be expected when reconstructing the components of the stress applied in the contact area.

EXAMPLE 4

The intention is to estimate the components of the forces which are applied in the contact area, and the self-alignment torque, on the basis of measurements of the circumferential extension of both sidewalls of the tire, measured at three azimuths on each sidewall. The measurement azimuths are selected in the following way:

Two azimuths selected symmetrically with respect to the azimuth of the center of the contact area (180°+α° and 180°−α°). Let $V_1^1$ and $V_2^1$ be the values measured at these azimuths on the first sidewall, and $V_1^2$ and $V_2^2$ the values measured at these azimuths on the second sidewall.

One azimuth corresponding to the center of the contact area. Let $V_c^1$ and $V_c^2$ be the values measured at these azimuths.

The processing is similar to that in Example 3. The values $V_c^1$ and $V_c^2$ allow a certain redundancy of the information, but above all better estimation of the component Fz.

As in Example 2, the provision of five measurements of circumferential deformation at five different azimuths on each sidewall makes it possible to distinguish between the contributions of the component Fy and of the camber angle. This configuration therefore makes it possible to evaluate the camber angle and the force components simultaneously under rolling conditions with a variable camber.

Compared with Example 2, the measurements on both sidewalls provide some degree of robustness. Specifically, because of the "load transfer" from one sidewall to the other when the camber angle is non-zero, a model using a measurement on both sidewalls and providing the sum of the estimates given by each sidewall is, by design, valid irrespective of the camber angle.

In the event that a is taken to be equal to $α_0$, the information about Fz is ed with the aid of $V_c^1$ and $V_c^2$, and the information about Fx, Fy and N is obtained using $V_1^1$, $V_1^2$, $V_2^1$ and $V_2^2$. An additional possibility for decoupling the various contributions is hence used.

The linear combinations taken by way of example above are very rudimentary, and only allow the principal effects to be taken into account. With a view to refining the estimations of the components of the forces and to taking the non-linear behaviour of the tire into account, the described method resorts to more sophisticated transfer functions for relating the measurements to the estimates of the forces. Any interpolation function making it possible to establish a link between the measured quantities and the values of the components of the applied constraint may be used in this context. Thus the coefficients of the interpolation function may be determined with the use of a training base (see below).

Although all the examples listed here use measurement azimuths which are selected so as to take maximum advantage of the symmetries of the tire and to facilitate reconstruction, the selection of the position of the azimuths at which the values are measured is free (symmetry of the azimuths is not obligatory per se), because any combination of a sufficient number of measurements makes it possible to estimate the components of the applied constraint. It is possible, in this case, to look directly for the functions giving the components Fx, Fy, Fz and N as a function of the measurements of circumferential extension of the sidewall or sidewalls, at known azimuths. The determination of the transfer functions is no longer based necessarily on analysis of the mechanics of the tire, but rather on the response of the tire, in terms of circumferential extension of the sidewall or sidewalls, to the forces which it experiences.

Figure 7:
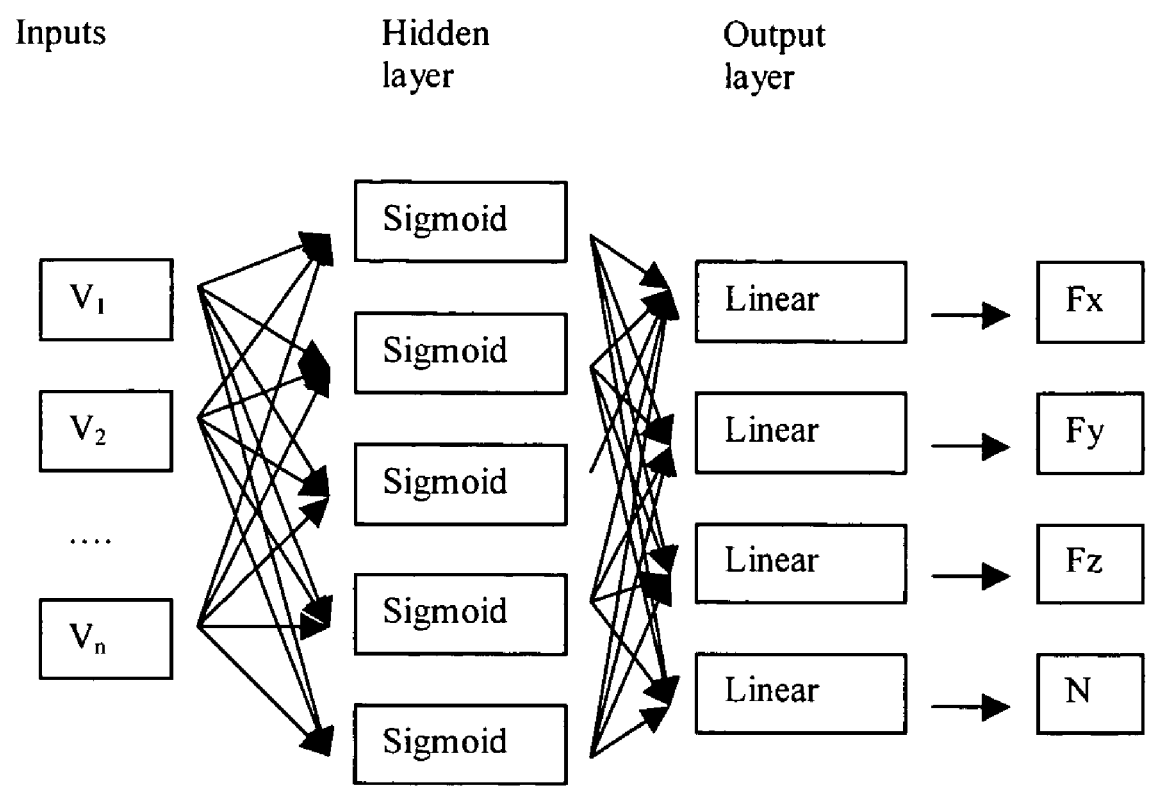
FIG. 7 shows the architecture of a neural network.

Whether the measurement azimuths are selected thanks to a physical analysis or decided more arbitrarily, neural networks seem highly suitable for establishing a transfer function between the measurements which are carried out and the components of the forces Fx, Fy, Fz and N. If appropriate, the camber angle may also be one of the quantities to be estimated, and it may appear at the output of the transfer function. Among the simplest applicable schemes, the use of networks having one layer of hidden neurons and one layer of output neurons may be adopted as the interpolation function for establishing a link between the measured quantities and the values of the components of the applied constraint. These hidden neurons use a sigmoid transfer function. The output neurons, for their part, use a linear transfer function (FIG. 7). The parsimony property of this type of network, when used as an approximator, is very beneficial here. It is possible to use one network per component to be estimated, or a network that makes it possible to estimate all the components thanks to a plurality of outputs.

Figure 8:
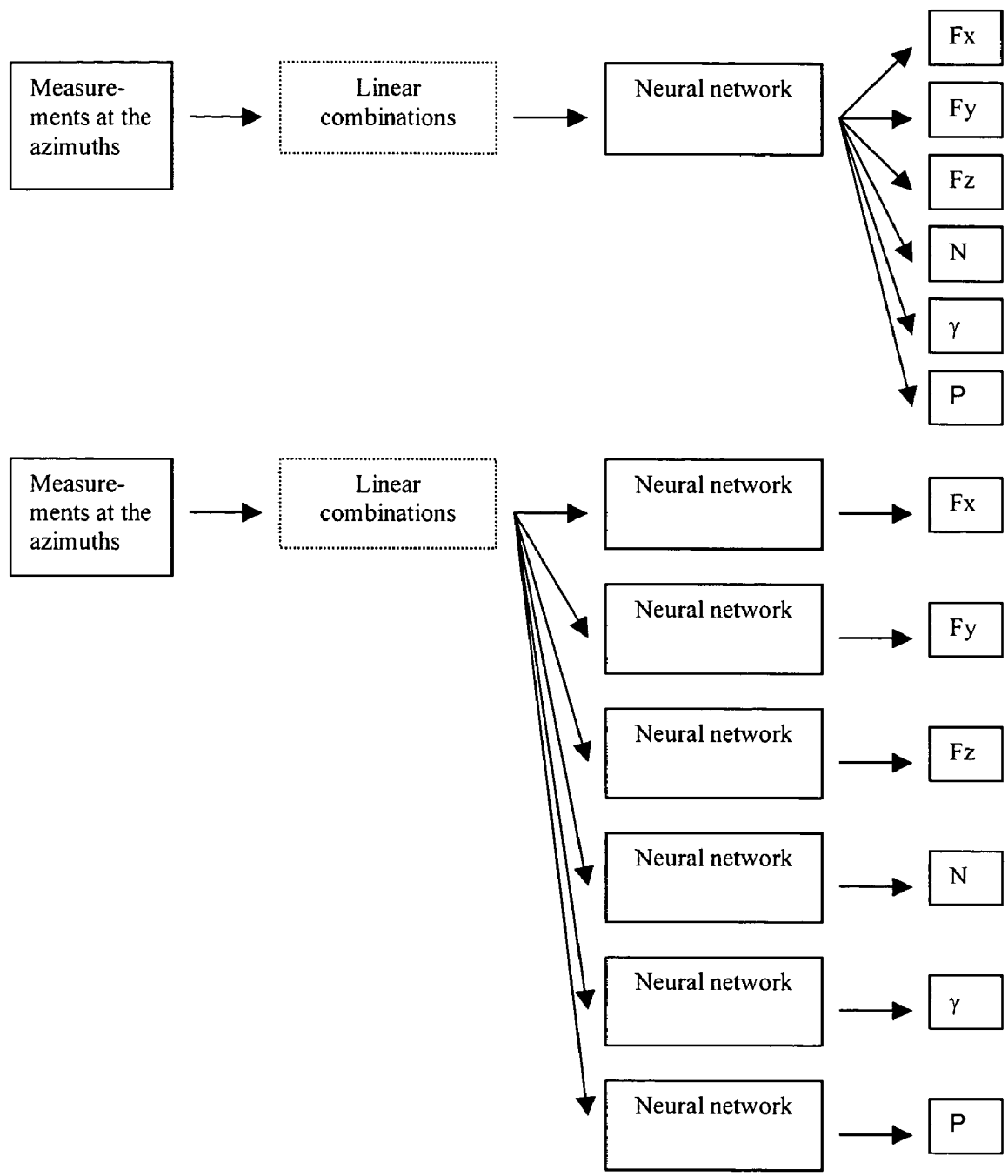
FIG. 8 shows examples of transfer functions.

If the measurement azimuths have been selected so as to take advantage of the symmetries or physical observations, it may be beneficial to make linear combinations of the quantities before input into the network. In this case, a principal component analysis will make it possible to determine the coefficients of these combinations expediently, and will simplify the required neural network. The architecture described in FIG. 8 is obtained, which shows examples of transfer functions for which the input linear combinations are optional. It is possible to use a neural network with a plurality of outputs, or a plurality of neural networks with one output, or any other combination. The possible output quantities (Fx, Fy, Fz, N, P and γ) are indicated, but, of course, the invention does not preclude attempts to estimate only some of them.

Specifically, the operation is carried out as follows:

The first step, after having determined the measurement azimuths, consists in collecting the values of the circumferential extension of the sidewall or sidewalls, during the solicitation of varied stresses on the tire which are selected so as to cover the full range in which evaluation of the selected characteristic or characteristics will be permitted in normal use. The selected stresses also need to involve all the couplings liable to be encountered during normal use. The set of measured values and the associated selected characteristic or characteristics (obtained by another measurement means) constitute the training base. Of course, in the event that the camber is subsequently likely to vary, it is desirable to incorporate variations of the camber angle which are representative of the future range of use into the training base.

The second step consists in carrying out the training of the weightings of the network (or, more generally, carrying out the determination of the coefficients of an interpolation function) on the base formed in this way. At the end of this phase, the transfer functions are obtained.

A third step consists in testing the transfer functions by comparing the estimates of the selected characteristic or characteristics with the values indicated by another measurement means.

Besides neural networks, it is possible to use polynomial functions, for example.

In the realistic case in which the inflation pressure of the tire is likely to change in the course of time, it may be necessary to take the pressure variations into account, depending on the precision desired for the measurement of the components in question.

A first procedure consists in correcting the estimated forces at the output of the transfer function as a function of the pressure. It is thus possible to carry out a first-order correction. Indeed, let there be a constraint applied to the tire in the event of a transfer function which does not take the pressure into account. If the pressure is double the reference pressure (at which the transfer function was established), the transfer function will see about two times less measured deformations as input than for the reference pressure. It will therefore evaluate forces that are two times weaker than the forces actually being applied. The estimated forces should be multiplied by two.

The most precise approach, however, consists in introducing the pressure as a parameter in the transfer functions. This involves:

carrying out the training of the transfer function or functions on a training base containing cases in which the tire is constrained under various conditions of inflation pressure covering the desired range of operation; and, Having at one's disposal a measurement or an estimate of the inflation pressure.

Without implying any limitation, two ways of knowing the pressure will be described below.

Figure 9A:
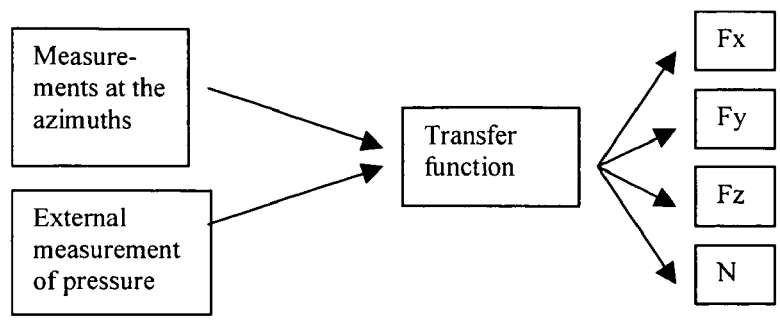
FIGS. 9a and 9b show two examples of an architecture allowing the inflation pressure of the tire to be taken into account if it varies, FIG. 9a including a pressure sensor, and FIG. 9b using an indirect pressure measuring means.

The first consists in using a pressure measurement given by a pressure sensor which is different from the specific sensors of the invention. The measured pressure value is then supplied to the system, in addition to the values of deformations at the azimuths to the transfer function or functions. FIG. 9a is a schematic of the associated architecture.

The second approach consists in estimating the inflation pressure on the basis of the measurements of circumferential deformation of the sidewalls. Indeed, the deformation signals have a structural component and a pneumatic component, which makes it possible to obtain information about the inflation pressure by analysing them.

This way of proceeding requires the determination of a transfer function which takes the measurements of deformation at the desired azimuths as its input, and which gives an estimate of the inflation pressure over the intended range of operation. The same methodology as that presented above is applicable:

Formation of a training base which mixes variations in the applied forces and in the inflation pressure.

Determination of a Transfer Function by Training.

Figure 9B:
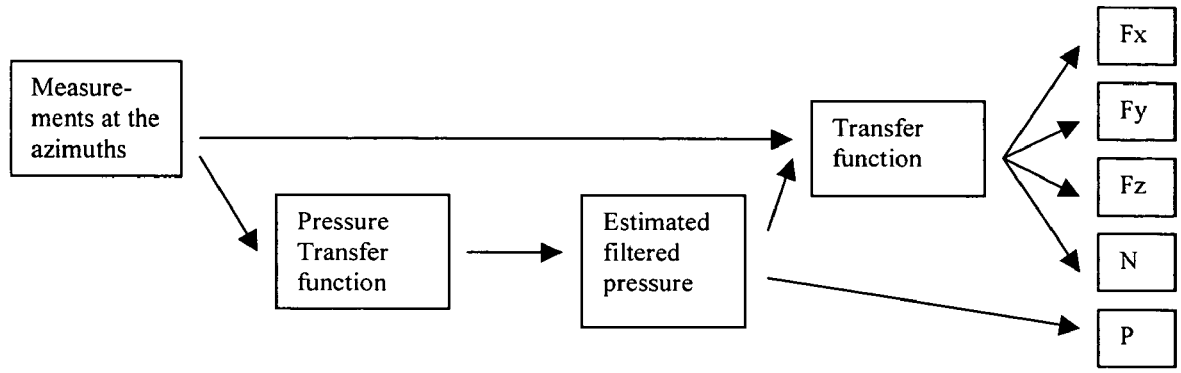

In practice, if the precision of a pressure determination performed as indicated above is deemed insufficient for a particular embodiment of the invention, it can be improved easily. Indeed, the change of the pressure in a tire is a phenomenon which is slow compared with the rotation of the tire. The pressure estimates can therefore be averaged or filtered so as to keep only the low-frequency components. A good estimate of the inflation pressure is then obtained. FIG. 9b is a schematic of the architecture which results from this approach. Besides knowledge of the resultants of forces in question, the method then provides an estimate of the inflation pressure without any additional sensor.

Naturally, many other variables (in addition to the measurements of circumferential extension) may be taken into account according to the same principle, in order to improve the efficiency of this determination. Such is the case, for example, concerning the temperature of the tire or the speed of rotation. Indeed, depending on the type of sensor and the position of the measurement, it may be that the circumferential deformation signals which are obtained depend slightly on the speed of rotation of the tire. In order to improve the precision of the estimates, it may then be beneficial to add the speed of rotation as an input parameter of the transfer function. Knowledge of the speed may then come from a measurement carried out by another component installed on the vehicle or, for example, it may be extracted from the deformation signals themselves.

In general, the number of measurement points may be higher than the minimal configurations presented in the examples, and may permit a result which is more precise or more reliable because of the redundancy of the available information.

An alternative way of increasing the precision or the robustness of the method consists in using a multi-dimensional measurement instead of a one-dimensional measurement, or in supplementing the measurement of extension in the circumferential direction with another measurement. For example, and without implying any limitation, both a circumferential deformation in a zone of the sidewall close to the tread and another measurement of circumferential deformation, in a zone of the sidewall close to the bead, may be used. As another example, for instance, this may involve measuring the radial extension due to the flexure of the sidewall, simultaneously with the circumferential extension. In this case, the inputs of the transfer function consist of an assortment of measurements of one or the other or different types of deformations at various azimuths. Apart from this difference, exactly the same procedure is used for determining the transfer function.

This approach turns out to be very beneficial because, in terms of producing the final product, it may be much simpler and less expensive to equip only a single bead, even if the sensor itself is more expensive to manufacture (in the case of a multi-dimensional measurement) or if several different sensors are necessary.

The measurement of the circumferential extension of the sidewall or sidewalls of the tire may be performed in any manner, using a device which is external to the tire or a device which is internal to the tire. By way of example, the use of one or more sensors which are placed in the tire, and which are therefore carried along in rotation by the tire, will be described here for measuring the circumferential extension.

This sensor or these sensors, integrated with the tire and locally measuring the circumferential extension of the sidewall or sidewalls, may employ any physical measurement principle. They may, for example, consist in dielectric sensors which measure a variation in capacitance linked with the distance separating two electrodes. The electrodes may consist of a conductive wire placed radially in the sidewall. This arrangement makes it possible to measure the "cord separation" by measuring the capacitance between the electrodes. If it is active, the sensor may be powered either by the vehicle, using wireless supply, or by a battery installed on the wheel or in the tire, or by any other means. Concerning the transmission of the information to the vehicle, it is possible to use electrical conduction means, or transmission may be carried out by radio or in any other suitable way. The sensor per se may deliver information continuously, or with a refresh frequency which is fast enough in relation to the period of rotation of the wheel.

This approach, using a sensor integrated with the tire, has the advantage of making it possible to know the circumferential extension of the sidewall or sidewalls at all the azimuths of the tire, since a sensor, when being carried along by the tire, explores all the azimuths during a rotation of the wheel.

The fact that the method of reconstructing the components of the forces is based on measuring the circumferential extension at certain azimuths entails the problem of locating the sensor in order to extract the values at the correct azimuths.

Figure 10:
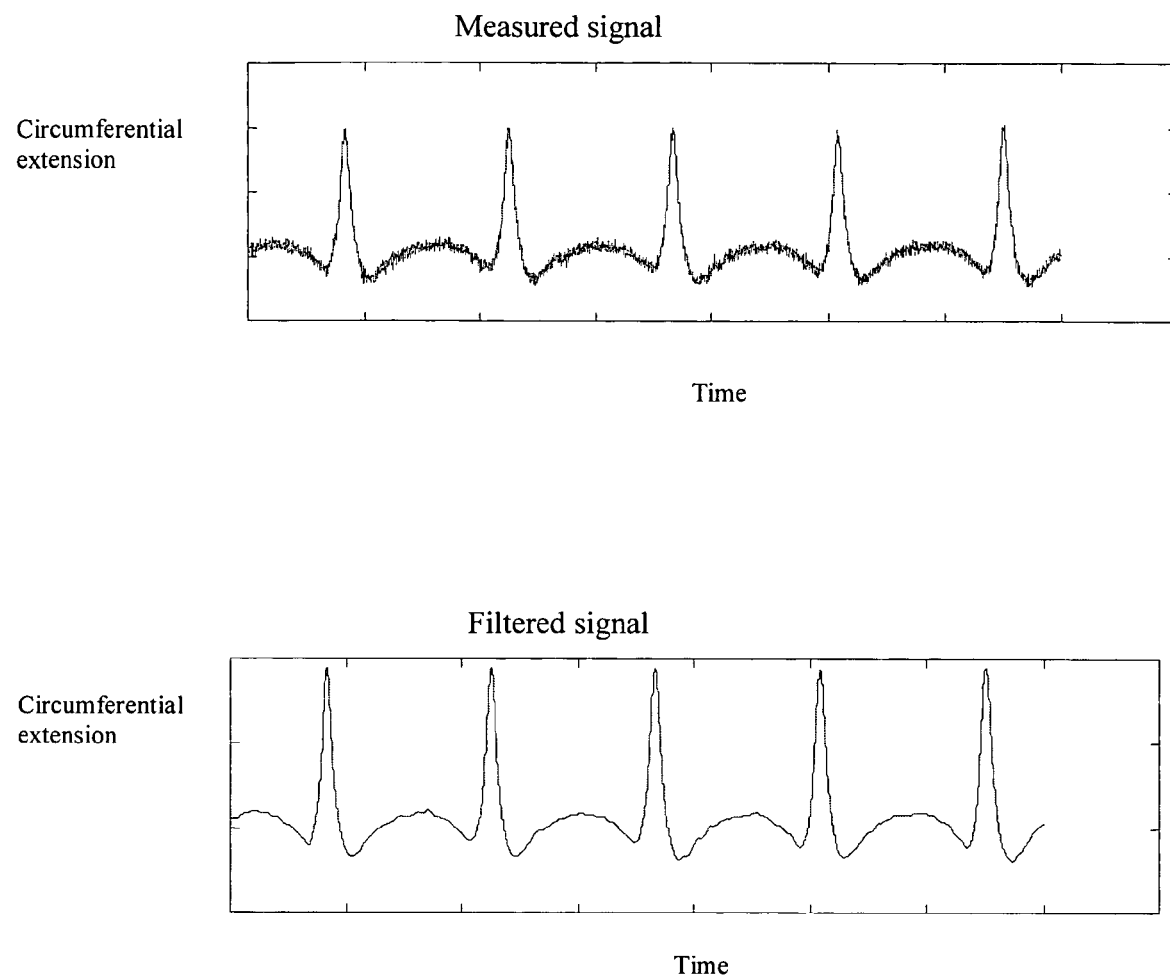
FIG. 10 shows the raw and filtered time signal.

The sensor is interrogated at a constant and known frequency. It therefore delivers a time signal of the variation in the local circumferential extension. A measured signal is presented in FIG. 10. On this time signal, it is easy to see the signature of a wheel revolution which was observed previously (FIGS. 1a, 1b, 2a, 2b, 3a and 3b). Further to the signature of each wheel revolution, this signal contains noise. The first operation consists in reducing this noise by applying a low-pass filter, the cut-off frequency of which may be linked with the speed of rotation of the wheel.

Several cases may then arise, depending on the available equipment:

If a measurement of the angular position of the wheel is available, it is possible to know the instants at which the sensor passes through the measurement azimuth. Reading the values measured at these instants provides the value of the circumferential extension at the desired azimuths. This measurement of the angular position of the wheel may, for example, be obtained by counting the transitions of an ABS sensor for the speed of rotation of the wheel.

If no external device is available to facilitate the location of the sensor, only the signal of the sensor itself can be used. The invention proposes to use the signal of the sensor, or of other sensors, if any, integrated with the tire, in order to estimate the angular position of the wheel.

Figure 11:
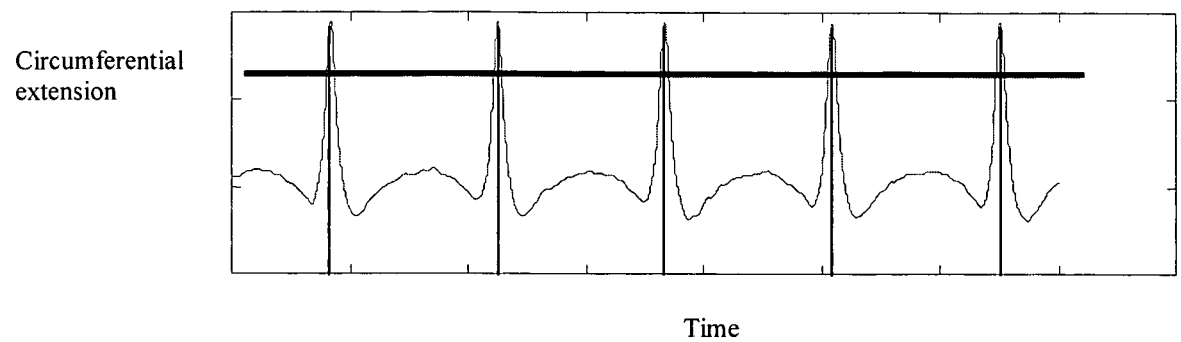
FIG. 11 shows the identification of passage through the contact area on the basis of the time signal.

Each passage of the sensor through the contact area has, as its signature, a very pronounced circumferential extension of the sidewalls of the tire. By using this observation, it is possible to find the instants at which the sensor passes through the center of the contact area. The simplest method for carrying out this operation consists in thresholding the filtered signal and in looking for the maxima among the values greater than this threshold ("algorithm 1"–FIG. 11). This approach makes it possible to avoid detecting the maxima which do not correspond to passage through the contact area.

The shape of the signal changes substantially as a function of the applied forces. In real conditions, the thresholding may turn out to be complicated, because the level of the threshold needs to be adapted constantly. Furthermore, under certain conditions, it may happen that the application of a threshold causes the detection of several extrema per wheel revolution. This situation is encountered when a large force Fy is applied.

One possible approach, but not the only approach, consists in using the following algorithm:

Using by default the previously explained algorithm, referred to as "algorithm 1."

When a periodicity is detected, using the time of the last passage through the contact area, and an evaluation of the speed based on the last passages, in order to predict the time $t_n$ of the future passage through the contact area.

Defining a signal window $[t_n-d; t_n+d]$ around $t_n$ with the aid of an uncertainty, d being less than half the period of the signal.

Carrying out the thresholding in this window in order to determine the true time $T_n$ which corresponds to the approximation $t_n$.

Performing a new iteration in order to detect the next revolution. In the event of an error (visibly false period, extremum found at the edge of the window, etc.) repeating "algorithm 1" in order to re-synchronise the process.

Each time another passage through the contact area is determined, knowledge of the instants of the last passages (at least 3 passages) makes it possible to estimate the speed of rotation of the wheel and its acceleration. Thanks to these estimates, it is possible to reconstruct an evaluation of the azimuth at which the sensor lies as a function of time. It then becomes possible to extract the values at certain azimuths from the measurements as a function of time.

As seen above, the estimate of the speed of rotation can be used as an input of the transfer function, in order to improve the precision of the estimation of the force components over a large range of speeds.

Several options are then available for implementing the measurement. Indeed, determining the components of the forces requires measurements at a plurality of azimuths.

Figure 12:
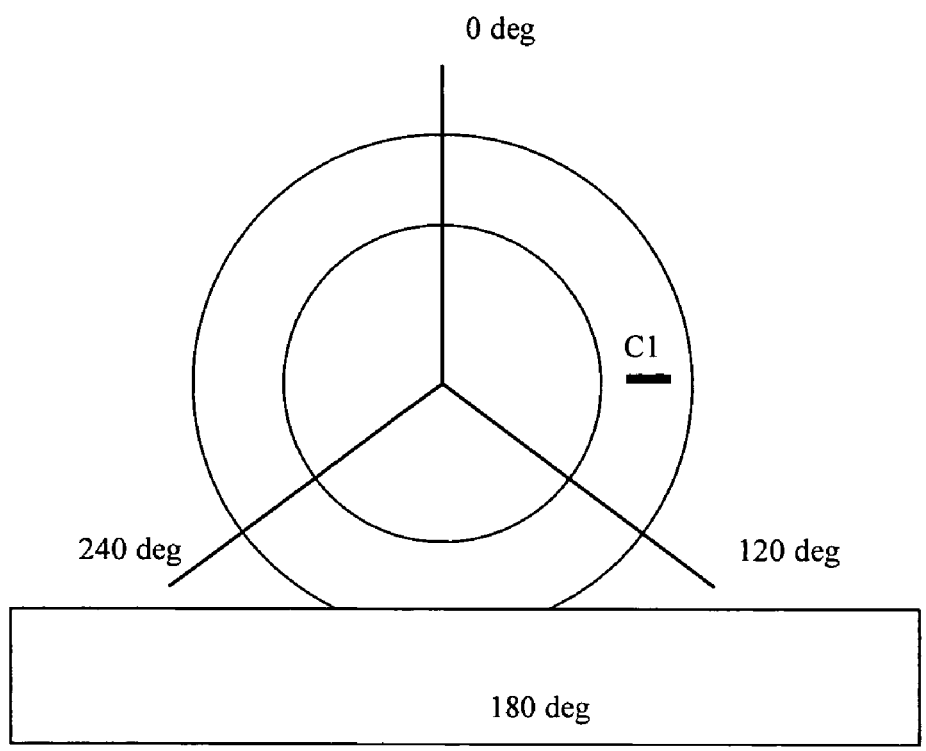
FIG. 12 shows an example of operation with one sensor and one model.

A first approach consists in using only one sensor on each sidewall for which measurements are intended to be obtained. At each passage through a required position, the value given by the sensor is taken into account in order to refresh the measurement at the azimuth in question. By making the assumption that the components of the forces vary slowly in relation to the speed of rotation of the wheel, a single sensor thus makes it possible to obtain the measurements at all the azimuths necessary for reconstruction of the forces. FIG. 12 presents this type of operation with a model (transfer function) which requires measurements at three azimuths (0°, 120° and 240°).

Figure 13:
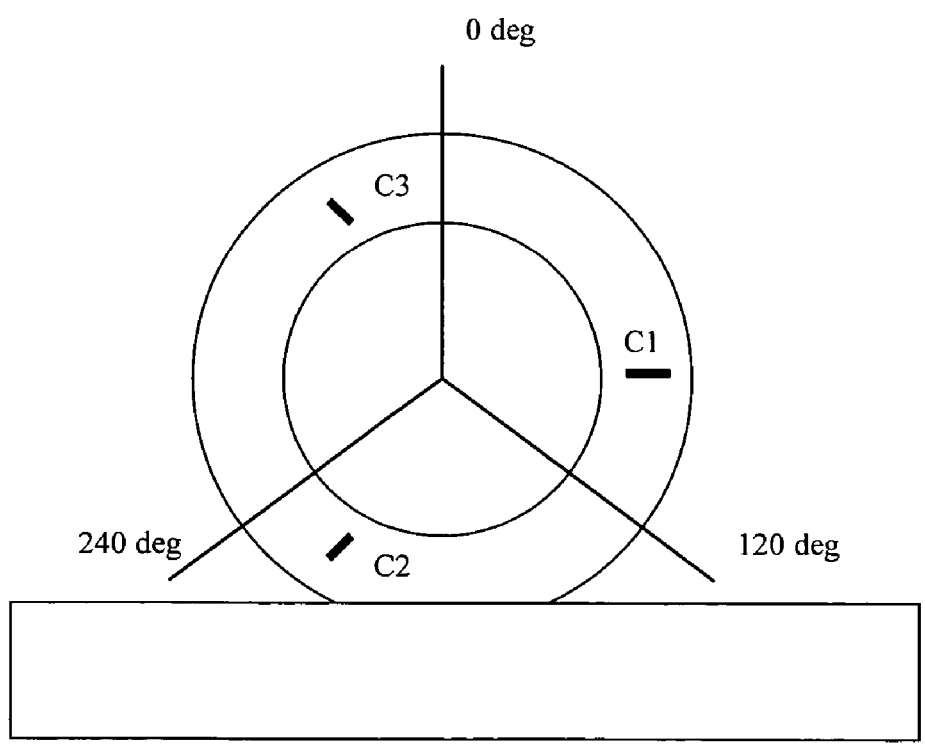
FIG. 13 shows an example of operation with three sensors and one model.

A second approach consists in providing a plurality of sensors over the circumference, so that, at least once per revolution, the sensors simultaneously lie at the azimuths where a measurement is intended to be carried out. It is thus possible to obtain an image of the deformation of the tire at various azimuths at a given instant, which no longer requires that the forces vary slowly in relation to the rotation of the wheel. Ideally (maximum passband), the number of sensors has to be at least equal to the number of quantities to be estimated. One implementation of this approach consists in providing the sensors in an equally distributed fashion around the tire. Hence, in the event that N sensors have been fitted, the situation in which the sensors are correctly positioned occurs at least N times per revolution. FIG. 13 presents this type of operation with three sensors, which arrive three times per revolution at the azimuths where the measurement is to be carried out (0°, 120° and 240°).

Lastly, it is possible to mix the approaches above.

Increasing the number of sensors makes it possible, in particular: to increase the refresh frequency of the estimation of the forces, and therefore the passband of the system; and to increase the robustness with respect to rapid variations of the components of the forces which are applied in the contact area.

Figure 14:
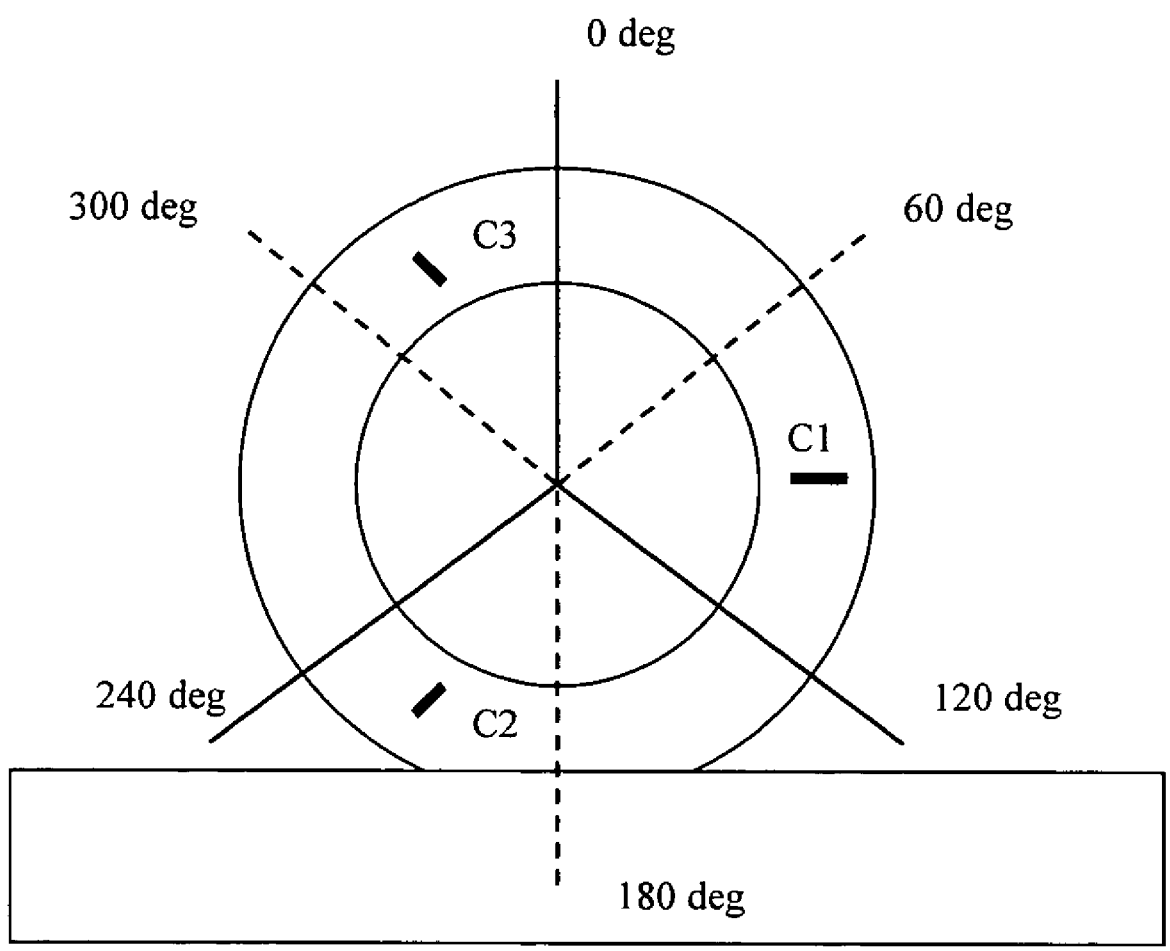
FIG. 14 shows an example of operation with three sensors and two models.

It should be noted that it is possible to determine a plurality of models which take the measurements at different azimuths as their input. Even with a single sensor, it is thus possible to obtain a plurality of estimates during each wheel revolution. FIG. 14 shows an example of operation with three sensors and two models: where the positions indicated by solid lines represent the azimuths at which the measurements for use as the input for model 1 are to be taken; where the positions indicated by dotted lines represent the azimuths at which the measurements for use as the input for model 2 are to be taken; and where C1, C2 and C3 represent the azimuthal positions of the sensors on the sidewall of a tire.

Two transfer functions are therefore determined. The first uses measurements at 0°, 120° and 240°, and the second uses measurements at 60°, 180° and 300°. When the sensors arrive at the intended measurement positions, the transfer function can be applied. By suitably managing the sensors, it is even possible in this type of arrangement to estimate the forces 6 times per wheel revolution. These estimates by a plurality of models may be averaged or compared in order to increase the precision and reduce the noise in the estimation of the forces.

What is claimed is:

1. A method of determining at least one characteristic of a tire selected from: the three components of a resultant of forces which are exerted by the road on the contact area of a tire, the self-alignment torque generated by the tire, the camber, and the pressure; the method comprising the steps of obtaining at least two measurements of circumferential extension or contraction between at least a pair of fixed points positioned at a same radius and being separated in azimuth in at least one sidewall of the tire, the at least two measurements being made at two predetermined azimuth positions of the tire that are separated in azimuth from the center of the contact area, calculating the characteristic from the at least two measurements, and generating a signal representing the calculated characteristic, for electronically controlling a vehicle.

2. The method according to claim 1, wherein the measurement azimuths are selected to be symmetrical with respect to the azimuth of the center of the contact area (180°+α and 180°−α), with α not equal to $α_0$, where $α_0$ is the azimuth at the entry of the contact area, $V_1^1$ and $V_2^1$ being the values measured at these azimuths on the first sidewall and $V_1^2$ and $V_2^2$ being the values measured at these azimuths on the second sidewall, an estimate of the component Fz is provided by $fz(a_1V_1^1+a_2^1V_2^1+b_1V_1^2+b_2V_2^2)$, where $a_1$, $a_2$, $b_1$ and $b_2$ are positive real coefficients and $f_z$ is a monotonic continuous function.

3. The method according to claim 1, wherein the measurement azimuths are selected to be symmetrical with respect to the azimuth of the center of the contact area ($180°+\alpha$ and $180°-\alpha$), with $\alpha$ not equal to $\alpha_0$, where $\alpha_0$ is the azimuth at the entry of the contact area, $V_1^1$ and $V_2^1$ being the values measured at these azimuths on the first sidewall and $V_1^2$ and $V_2^2$ being the values measured at these azimuths on the second sidewall, an estimate of the component Fx of the applied force is provided by $f_x(c_1V_1^1-c_2V_2^1+d_1V_1^2-d_2V_2^2)$, where $c_1$, $c_2$, $d_1$ and $d_2$ are positive real coefficient and $f_x$ is a monotonic continuous function.

4. The method according to claim 1, wherein the measurement azimuths are selected to be symmetrical with respect to the azimuth of the center of the contact area ($180°+\alpha$ and $180°\alpha$), with a not equal to $\alpha_0$, where $\alpha_0$ is the azimuth at the entry of the contact area, $V_1^1$ and $V_2^1$ being the values measured at these azimuths on the first sidewall and $V_1^2$ and $V_2^2$ being the values measured at these azimuths on the second sidewall, an estimate of the component Fy of the applied force provided by $f_y(e_1V_1^1+e_2V_2^1-f_1V_1^2-f_2V_2^2)$, where $e_1$, $e_2$, $f_1$ and $f_2$ are positive real coefficients and $f_y$ is a monotonic continuous function.

5. The method according to claim 1, wherein the measurement azimuths are selected to be symmetrical with respect to the azimuth of the center of the contact area ($180°+\alpha$ and $180°\alpha$), with a not equal to $\alpha_0$, where $\alpha_0$ is the azimuth at the entry of the contact area, $V_1^1$ and $V_2^1$ being the values measured at these azimuths on the first sidewall and $V_1^2$ and $V_2^2$ being the values measured at these azimuths on the second sidewall, an estimate of the self-alignment torque N is provided by $f_n(g_1V_1^1-g_2V_2^1-h_1V_1^2+h_2V_2^2)$, where $g_1$, $g_2$, $h_1$ and $h_2$ are positive real coefficients and $f_n$ is a monotonic continuous function.

6. The method according to claim 1, wherein, the camber angle is estimated from a detected difference in load supported by each of the sidewalls on the basis of measurements of circumferential extension or contraction.

7. The method according to claim 1, wherein tire pressure is estimated by obtaining measurements of circumferential extension or contraction and determining a contribution due to the pneumatic behavior separate from a contribution due to the structural behavior.

8. The method according to claim 1, wherein at least three measurements of circumferential extension or contraction in a single sidewall of the tire are used.

9. The method according to claim 1, wherein the measurement azimuths are selected to be symmetrical with respect to the azimuth of the center of the contact area ($180°+\alpha$ and $180°-\alpha$), with $\alpha$ not equal to $\alpha_0$, where $\alpha_0$ is the azimuth at the entry of the contact area, and $V_1$ and $V_2$ being the values measured at these other azimuths, an estimate of Fx is provided by $f_x(r_2V_2-r_1V_1)$, where $r_1$ and $r_2$ are positive real coefficients and $f_x$ is a monotonic continuous function.

10. The method according to claim 1, wherein measurements of circumferential extension or contraction are performed for at least three predetermined azimuth positions of the tire, which azimuth positions are defined such that:
a first azimuth position corresponds to one of: the azimuth of the center of the contact area; and the azimuth of a point opposite to the contact area;
a second azimuth position and third azimuth position are symmetrically located with respect to a vertical plane passing through the center of the contact area.

11. The method according to claim 10, wherein the first azimuth position corresponds to the middle of the contact area (azimuth 180°) and $V_c$ is a value measured at the first position azimuth, the second and third azimuth positions are selected to be symmetrical with respect to the azimuth of the center of the contact area ($180°+\alpha$ and $180°-\alpha$), with $\alpha$ not equal to $\alpha_0$, where $\alpha_0$ is the azimuth at the entry of the contact area, and $V_1$ and $V_2$ are values measured at the second and third azimuth positions, respectively, and an estimate of Fz is provided by $f_z(s_cV_c-(s_1V_1+s_2V_2))$, where $s_1$, $s_2$ and $s_c$ are positive real coefficients and $f_z$ is a monotonic continuous function.

12. The method according to claim 10, in which, the first azimuth position corresponds to the middle of the contact area (azimuth 180°) and $V_c$ being the value measured at the first azimuth position, the second and third azimuth positions being selected symmetrically with respect to the azimuth of the center of the contact area ($180°+\alpha$ and $180°-\alpha$), with $\alpha$ not equal to $\alpha_0$, where $\alpha_0$ is the azimuth at the entry of the contact area, and $V_1$ and $V_2$ being the values measured at the second and third azimuth positions, respectively, an estimate of Fy is provided by $f_y(u_cV_c+u_1V_1+u_2V_2)$, where $u_1$, $u_2$ and $u_c$, are positive real coefficients and $f_y$ is a monotonic continuous function.

13. A method of determining at least one characteristic of a tire selected from: the three components of a resultant of forces which are exerted by the road on the contact area of a tire, the self-alignment torque generated by the tire, the camber, and the pressure; the method comprising the steps of obtaining at least two measurements of circumferential extension or contraction between at least a pair of fixed points positioned at a same radius and being separated in azimuth in each of the sidewalls of the tire, the at least two measurements being made at two predetermined azimuth positions of the tire that are separated in azimuth from the center of the contact area, calculating the characteristic from the at least two measurements, and generating a signal representing the calculated characteristic, for electronically controlling a vehicle,
wherein the circumferential contraction or extension of both of the sidewalls is estimated by measuring the distance between the cords of the carcass ply in the sidewalls.

14. A method of determining at least one characteristic of a tire selected from: the three components of a resultant of forces which are exerted by the road on the contact area of a tire, the self-alignment torque generated by the tire, the camber, and the pressure; the method comprising the steps of obtaining at least two measurements of circumferential extension or contraction between at least a pair of fixed points positioned at a same radius and being separated in azimuth in each of the sidewalls of the tire, the at least two measurements being made at two predetermined azimuth positions of the tire that are separated in azimuth from the center of the contact area, calculating the characteristic from the at least two measurements, and generating a signal representing the calculated characteristic, for electronically controlling a vehicle,
wherein the circumferential contraction or extension of both of the sidewalls is estimated by measuring the distance between wires forming a sensor which measures a variation in capacitance linked with the distance separating two electrodes.

15. A method of determining at least one selected characteristic of a tire selected from: the three components of a resultant of forces which are exerted by the road on the contact area of a tire, the self-alignment torque generated by the tire, the camber, and the pressure, comprising the following steps:
determining measurement azimuths and collecting values of circumferential extension of at least one sidewall during varied stresses on the tire which stresses are selected to span a full range in which evaluation of the at least one selected characteristic will be permitted in normal use, the selected stresses giving rise to all the couplings liable to be encountered during normal use, obtaining values of circumferential extension with a first measurement means and values of the at least one selected characteristic associated with circumferential extension with a second measurement means in order to form a training base, determining coefficients of a transfer function to establish a link between the values of circumferential extension and the values of the at least one selected characteristic using the training base, generating signals representing estimates of the at least one selected characteristic obtained by the transfer function, for comparison to measured values, and testing the transfer functions by comparing the generated signals representing estimates of the at least one selected characteristic with the values obtained by a direct measurement means.

16. The method of determination according to claim 15, wherein the transfer function is a network having one layer of hidden neurons and one layer of output neurons.

* * * * *

UNITED STATES PATENT AND TRADEMARK OFFICE
CERTIFICATE OF CORRECTION

PATENT NO. : 7,203,603 B2
APPLICATION NO. : 10/773015
DATED : April 10, 2007
INVENTOR(S) : David Bertrand It is certified that error appears in the above-identified patent and that said Letters Patent is hereby corrected as shown below:

COLUMN 3

Line 40, "models:" should read --models.--.

COLUMN 5

Line 63, "$s_i$ is" should read --wherein $s_i$ is--.

COLUMN 6

Line 8, "$s^P$ is" should read --wherein $s^P$ is--.
Line 11, "and $s_p$," should read --and $s_p$.--.
Line 21, "force Fy;" should read --force Fy; and--.

COLUMN 7

Line 9, "coefficient" should read --coefficients--.
Line 63, "(180° α° and" should read --(180°+α° and--.

COLUMN 8

Line 7, "$f_z(a_1V_1^1+a_2V_2^1+b_1V_l^2+b_2V_2^2),$" should read
--$f_2(a_1V_1^1 a_2V_2^1+b_1V_1^2+b_2V_2^2),$--.
Line 13, "$f_x(c_1V_1^1-c_2V_2^1+d_1V_l^2-d_2V_2^2),$" should read
--$f_x(c_1V_1^1-c_2V_2^1+d_1V_1^2-d_2V_2^2),$--.
Line 19, "$e_2,f_1$ and" should read --$e_2$, $f_1$ and--.
Line 66, "a is" should read --α is--.

COLUMN 10

Line 52, "Having" should read --having--.

COLUMN 14

Line 58, "with a" should read --with α--; and "$α_o$is" should read --$α_o$ is--.
Line 63, "$f_z(a_1V_1^{1+}a_2^1V_2^1+b_iV_1^2+b_2V_2^2),$" should read
--$f_z(a_1V_1^1+a_2V_2^1+b_1V_1^2+b_2V_2^2),$--.

UNITED STATES PATENT AND TRADEMARK OFFICE
CERTIFICATE OF CORRECTION

PATENT NO. : 7,203,603 B2
APPLICATION NO. : 10/773015
DATED : April 10, 2007
INVENTOR(S) : David Bertrand It is certified that error appears in the above-identified patent and that said Letters Patent is hereby corrected as shown below:

COLUMN 15

Line 7, "of the applied force" should be deleted.
Line 8, "$C_2V_2^1+d_1V_1^2-d_2V_2^2$)," should read --$c_2V_2^1+d_1V_1^2-d_2V_2^2$),--.
Line 9, "coefficient" should read --coefficients--.
Line 13, "(180°a), with a" should read --(180°-α), with α--.
Line 24, "(180°a), with a" should read --(180°-α), with α--.
Line 59, "area;" should read --area; and--.

Signed and Sealed this

Twentieth Day of November, 2007

JON W. DUDAS
*Director of the United States Patent and Trademark Office*